US008060585B2

(12) United States Patent
Waud et al.

(10) Patent No.: US 8,060,585 B2
(45) Date of Patent: Nov. 15, 2011

(54) SELF SERVICE DISTRIBUTION CONFIGURATION FRAMEWORK

(75) Inventors: Earl N. Waud, San Diego, CA (US); Brendan M. McAuliffe, San Diego, CA (US); David K. Hewett, San Diego, CA (US); Eric R. Breihan, Carlsbad, CA (US); John M. Williams, San Diego, CA (US); Jason W. Kelley, San Diego, CA (US); Michael G. Doose, Santee, CA (US)

(73) Assignee: QUALCOMM Incorporated, San Diego, CA (US)

( * ) Notice: Subject to any disclaimer, the term of this patent is extended or adjusted under 35 U.S.C. 154(b) by 194 days.

(21) Appl. No.: 12/124,045

(22) Filed: May 20, 2008

(65) Prior Publication Data

US 2009/0198801 A1 Aug. 6, 2009

Related U.S. Application Data

(60) Provisional application No. 61/026,693, filed on Feb. 6, 2008.

(51) Int. Cl.
*G06F 15/177* (2006.01)

(52) U.S. Cl. ........ 709/221; 709/218; 709/223; 711/144; 711/162

(58) Field of Classification Search .................. 709/218, 709/221, 223
See application file for complete search history.

(56) References Cited

U.S. PATENT DOCUMENTS

| | | | | |
|---|---|---|---|---|
| 7,565,661 | B2 * | 7/2009 | Sim-Tang | 719/318 |
| 2002/0173997 | A1 * | 11/2002 | Menard et al. | 705/7 |
| 2003/0187967 | A1 * | 10/2003 | Walsh et al. | 709/223 |
| 2007/0198656 | A1 * | 8/2007 | Mazzaferri et al. | 709/218 |
| 2007/0219916 | A1 * | 9/2007 | Lucas | 705/58 |
| 2008/0126110 | A1 * | 5/2008 | Haeberle et al. | 705/1 |
| 2008/0184225 | A1 * | 7/2008 | Fitzgerald et al. | 718/1 |
| 2009/0006884 | A1 * | 1/2009 | Cahill et al. | 714/4 |
| 2010/0064341 | A1 * | 3/2010 | Aldera | 726/1 |

* cited by examiner

*Primary Examiner* — Wing Chan
*Assistant Examiner* — Tesfay Yohannes
(74) *Attorney, Agent, or Firm* — Francois A Pelaez; James T. Hagler

(57) ABSTRACT

A self-service distribution configuration framework integrates with a directory services and Systems Management Server (SMS) of an enterprise computing system for web based self service configuration changes on a server owner defined schedule. The framework will cross reference the SMS database with the configuration framework database and dynamically update or create SMS server collections and advertisements for each unique time and day selected. For example, all systems that have had "Monday at 8 PM" selected as their scheduled date and time would become a member of the same collection. Upon opening the web site, the system owner is presented a data grid populated with a list of servers for which the individual is responsible, enabling selection of specific days and times for each server at which configuration changes sent by the SMS will occur.

28 Claims, 8 Drawing Sheets

Server Administration & Maintenance

Report Bug   Feedback   Patch Tool

Distribution List(s) [GKChesterton ▽] — 434
[Go] — 436

Enter Host Name to Query
[                    ]
[Query]

Search Results For:   GKChesterton

[Submit]

| Patching | | | | Under Maintenance | | | | | |
|---|---|---|---|---|---|---|---|---|---|
| Select | Host Name | Crit Lvl | SMS * | System | Patch day | Patch time | Exclude | Maintained By | Updated By | Last Update |
| ☐ | p2v-4 | 3 | ! | win2k3 | Thursday ▽ | 08:00 PM ▽ | ✓ | win.infra.page | najsmith | 4/2/08 11:32AM |
| ☐ | powerp2v | 2 | ! | win2k3 | Thursday ▽ | 08:00 PM ▽ | ☐ | win.infra.page | najsmith | 4/2/08 11:32AM |

Patch times occur during San Diego local time. Patches that require reboots will not take effect the system is rebooted. Delaying reboots can cause unexpected results with other scheduled patching and newly installed applications. Additionally, there will be times when other updates beyond Company Security patches will be applied to servers.

402 ↗

☐ * Red indicates that no SMS client is installed or no SCAN data available.    ▨ * Green indicates that server patches are up to date.
▤ * Yellow indicates patches need to be applied based on number shown.    ▨ * Gray -- Patch scan has not occurred in 14 days.

400

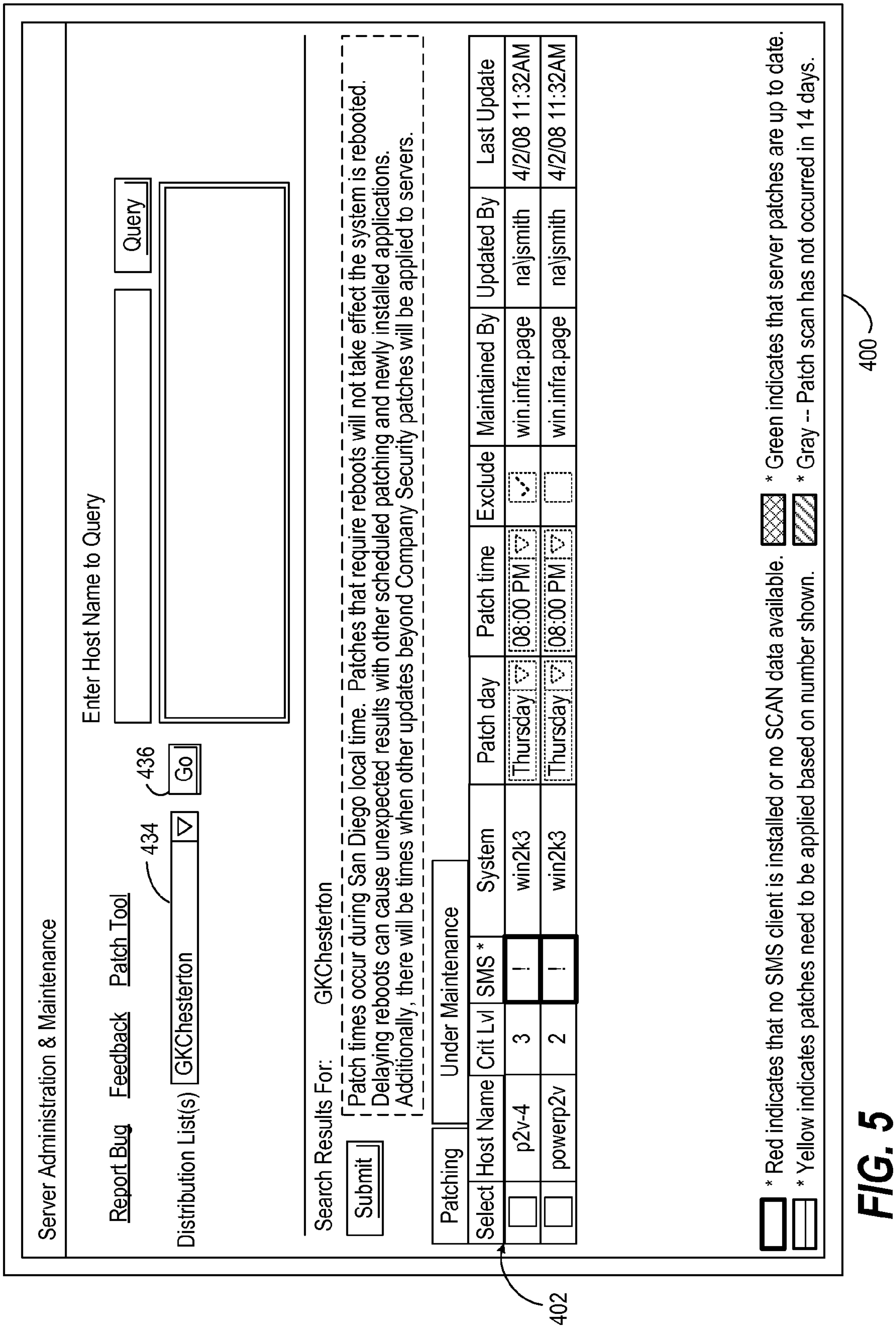

FIG. 5

Figure 7:
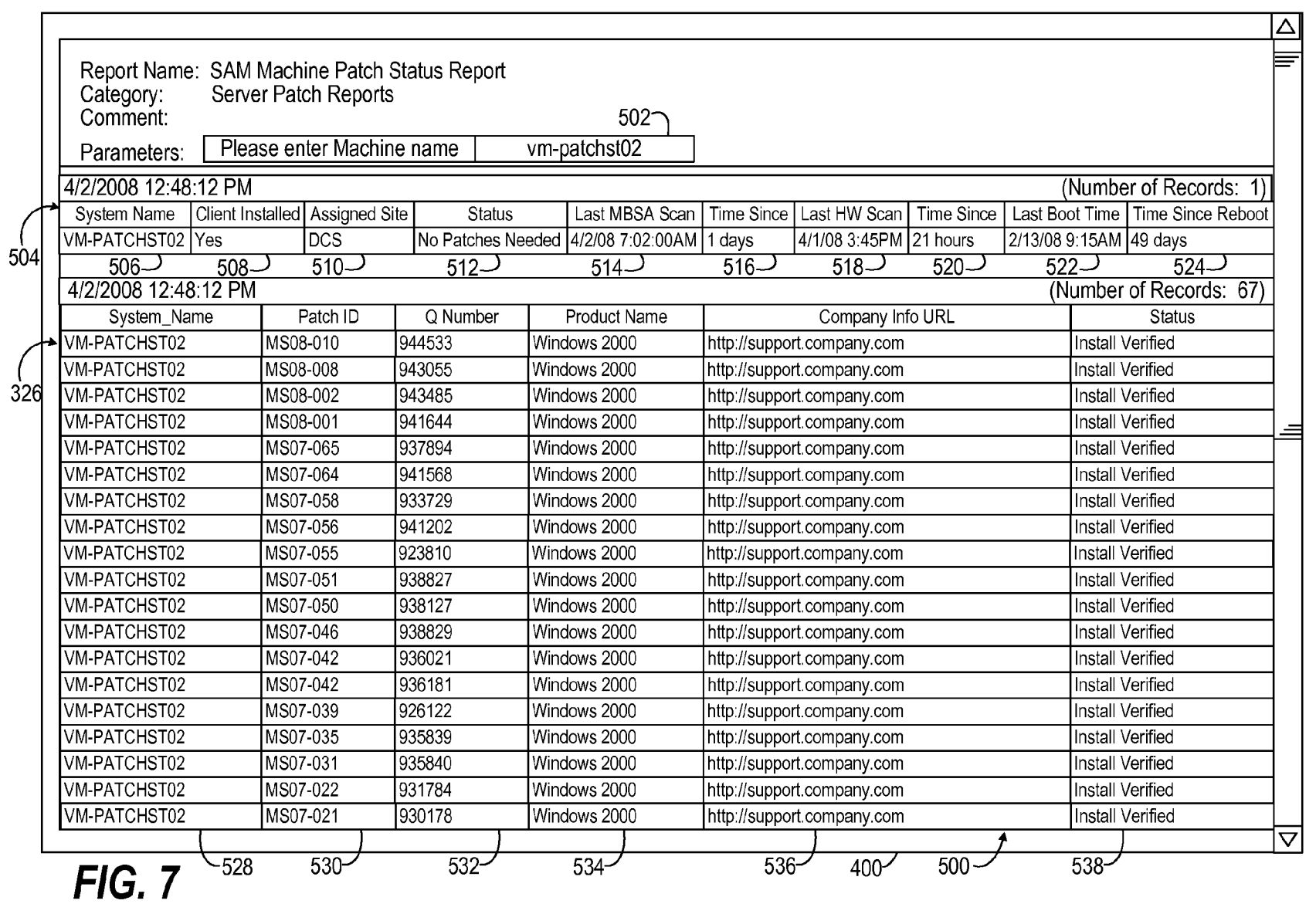

Report Name: SAM Machine Patch Status Report
Category: Server Patch Reports
Comment:
502
Parameters: Please enter Machine name | vm-patchst02

4/2/2008 12:48:12 PM (Number of Records: 1)

504

| System Name | Client Installed | Assigned Site | Status | Last MBSA Scan | Time Since | Last HW Scan | Time Since | Last Boot Time | Time Since Reboot |
|---|---|---|---|---|---|---|---|---|---|
| VM-PATCHST02 | Yes | DCS | No Patches Needed | 4/2/08 7:02:00AM | 1 days | 4/1/08 3:45PM | 21 hours | 2/13/08 9:15AM | 49 days |
| 506 | 508 | 510 | 512 | 514 | 516 | 518 | 520 | 522 | 524 |

4/2/2008 12:48:12 PM (Number of Records: 67)

326

| System_Name | Patch ID | Q Number | Product Name | Company Info URL | Status |
|---|---|---|---|---|---|
| VM-PATCHST02 | MS08-010 | 944533 | Windows 2000 | http://support.company.com | Install Verified |
| VM-PATCHST02 | MS08-008 | 943055 | Windows 2000 | http://support.company.com | Install Verified |
| VM-PATCHST02 | MS08-002 | 943485 | Windows 2000 | http://support.company.com | Install Verified |
| VM-PATCHST02 | MS08-001 | 941644 | Windows 2000 | http://support.company.com | Install Verified |
| VM-PATCHST02 | MS07-065 | 937894 | Windows 2000 | http://support.company.com | Install Verified |
| VM-PATCHST02 | MS07-064 | 941568 | Windows 2000 | http://support.company.com | Install Verified |
| VM-PATCHST02 | MS07-058 | 933729 | Windows 2000 | http://support.company.com | Install Verified |
| VM-PATCHST02 | MS07-056 | 941202 | Windows 2000 | http://support.company.com | Install Verified |
| VM-PATCHST02 | MS07-055 | 923810 | Windows 2000 | http://support.company.com | Install Verified |
| VM-PATCHST02 | MS07-051 | 938827 | Windows 2000 | http://support.company.com | Install Verified |
| VM-PATCHST02 | MS07-050 | 938127 | Windows 2000 | http://support.company.com | Install Verified |
| VM-PATCHST02 | MS07-046 | 938829 | Windows 2000 | http://support.company.com | Install Verified |
| VM-PATCHST02 | MS07-042 | 936021 | Windows 2000 | http://support.company.com | Install Verified |
| VM-PATCHST02 | MS07-042 | 936181 | Windows 2000 | http://support.company.com | Install Verified |
| VM-PATCHST02 | MS07-039 | 926122 | Windows 2000 | http://support.company.com | Install Verified |
| VM-PATCHST02 | MS07-035 | 935839 | Windows 2000 | http://support.company.com | Install Verified |
| VM-PATCHST02 | MS07-031 | 935840 | Windows 2000 | http://support.company.com | Install Verified |
| VM-PATCHST02 | MS07-022 | 931784 | Windows 2000 | http://support.company.com | Install Verified |
| VM-PATCHST02 | MS07-021 | 930178 | Windows 2000 | http://support.company.com | Install Verified |

SELF SERVICE DISTRIBUTION CONFIGURATION FRAMEWORK

CLAIM OF PRIORITY UNDER 35 U.S.C. §119

The present Application for Patent claims priority to Provisional Application No. 61/026,693 entitled "SELF SERVICE DISTRIBUTION CONFIGURATION FRAMEWORK" filed 6 Feb. 2008, and assigned to the assignee hereof and hereby expressly incorporated by reference herein.

BACKGROUND

1. Field

The present disclosure is related to enterprise distribution systems (EDS) that manage the distribution of software upgrade and patches to network devices, and in particular to system administration and management portals that coordinate timing of such deployments in accordance with administrator privileges.

2. Background

Computer networks can correspond to a number of computing devices connected via various communication links. Small companies tend to have computer networks in which each end user computer system is generally individually configured with required software, upgrades and software patches. Often, the owner (e.g., a supervisor or director) of a collection of such end user computer systems thus has significant input into the computing needs of his subordinates. For example, an information technology (IT) technician assigned to that particular business unit can have sufficient network privileges to implement each needed software configuration change. Additional system and software capabilities can thus be scheduled when needed and implemented at a time that is not disruptive to the business unit. While this flexibility has certain advantages, this can be extremely inefficient in requiring a relatively large number of IT personnel for the population of systems.

In a typical larger scale network environment, an "enterprise" network may include a plurality of server and client computing devices at several geographic locations. As computer networks grow in size and complexity, there is a need for administrative tools that facilitate software distribution, asset management and/or software patch deployment. One such administrative tool is Microsoft Corporation's Systems Management Server ("SMS"). In administrative tools, such as SMS, computers (e.g., servers) are located throughout a computer network and are configured to have a specific software distribution/management role. Often times, the specific configuration of a server will depend on the network topology and/or the anticipated software distribution load of the network. For example, in SMS, a server can have one of many possible management/distribution roles, such as a central server, distribution point, secondary site, management point, reporting point, and the like.

In order to preserve the integrity of the system, a relatively small number of enterprise administrators have sufficient authorization to make changes across the enterprise by making changes via the SMS. Individual business units generally have limited input to changes to the SMS in order to preserve such economies of scale. For example, an enterprise-wide downtime can be scheduled over night during a weekend as a generally acceptable solution to avoiding network disruptions. However, waiting a number of business days can be detrimental in certain situations, or can interfere with a particular project that plans to work during the generally-scheduled downtime.

Thus, conventional solutions offer all or nothing administrative control, especially for enterprise-scaled systems that do not allow control by individual requesters. In particular, requesters do not have the ability to specify the specific date and time that the changes will be applied.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with combining efficiencies of an enterprise distribution system (EDS) with flexible downtime scheduling. Yet individual computer system owners need not burden information technology (IT) expert personnel nor threaten system integrity by expanding the number given higher system permissions/authorization. Thereby, particular business units receive the system updates they need in a timely fashion with less impact to their needed availability.

In one aspect, a method is provided for managing downtime for software modifications to a population of networked computing systems. A management credential of a user is received. A subset of system management servers of an enterprise computing network permitted to be managed by the user are determined based on the management credentials, wherein the subset of system management servers is less than an entirety of the system management servers. Configuration management actions permitted to be taken by the user are determined based on the management credentials. A configuration change from the user is received, wherein the configuration change identifies a user-defined downtime window, a configuration management action, and at least one of the subset of system management servers, wherein the configuration change schedules the configuration management action during the user-defined downtime window for the at least one of the subset of system management servers. Different server collections on the enterprise computing network are created, wherein each server collection comprises respective system management servers having a respective user-defined downtime window within a common range of time. The created different server collections are stored for a subsequent software modification of the subset of system management servers in accordance with the user-defined downtime window.

In another aspect, at least one processor is provided for managing downtime for software modifications to a population of networked computing systems. A first module receives a management credential of a user. A second module determines, based on the management credential, a subset of system management servers of an enterprise computing network permitted to be managed by the user, wherein the subset of system management servers is less than an entirety of the system management servers. A third module determines, based on the management credential, configuration management actions permitted to be taken by the user. A fourth module receives a configuration change from the user, wherein the configuration change identifies a user-defined downtime window, a configuration management action, and at least one of the subset of system management servers, wherein the configuration change schedules the configuration management action during the user-defined downtime window for the at least one of the subset of system management servers. A fifth module creates different server collections on the enterprise computing network, wherein each server collection comprises respective system management servers having a respective user-defined downtime window within a common range of time. A sixth module stores the created different server collections for a subsequent software modification of the subset of system management servers in accordance with the user-defined downtime window.

In an additional aspect, a computer program product is provided for managing downtime for software modifications to a population of networked computing systems by having computer-readable medium that comprises sets of codes for causing a computer to perform the afore-mentioned method.

In another additional aspect, an apparatus is provided for managing downtime for software modifications to a population of networked computing systems. Means are provided for receiving a management credential of a user. Means are provided for determining, based on the management credential, a subset of system management servers of an enterprise computing network permitted to be managed by the user, wherein the subset of system management servers is less than an entirety of the system management servers. Means are provided for determining, based on the management credential, configuration management actions permitted to be taken by the user. Means are provided for receiving a configuration change from the user, wherein the configuration change identifies a user-defined downtime window, a configuration management action, and at least one of the subset of system management servers, wherein the configuration change schedules the configuration management action during the user-defined downtime window for the at least one of the subset of system management servers. Means are provided for creating different server collections on the enterprise computing network, wherein each server collection comprises respective system management servers having a respective user-defined downtime window within a common range of time. Means are provided for storing the created different server collections for a subsequent software modification of the subset of system management servers in accordance with the user-defined downtime window.

In a further aspect, an apparatus manages downtime for software modifications to a population of networked computing systems with directory service database. A self-serve configuration distribution framework receives a management credential of a user, and determines, based on the management credential, a subset of system management servers of an enterprise computing network permitted to be managed by the user, wherein the subset of system management servers is less than an entirety of the system management servers by referring the directory service database, and for determining, based on the management credential, configuration management actions permitted to be taken by the user. A configuration management database receives a configuration change from the user, wherein the configuration change identifies a user-defined downtime window, a configuration management action, and at least one of the subset of system management servers, wherein the configuration change schedules the configuration management action during the user-defined downtime window for the at least one of the subset of system management servers for creating different server collections on the enterprise computing network, wherein each server collection comprises respective system management servers having a respective user-defined downtime window within a common range of time, and stores the created different server collections for a subsequent software modification of the subset of system management servers in accordance with the user-defined downtime window.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIG. 5 is a diagram of the GUI for a SAM framework portal depicting a distribution list for a non-supervisory administrator;

FIG. 7 is a diagram of the GUI for the SAM framework portal depicting a server report.

DETAILED DESCRIPTION

A self-service distribution configuration framework integrates with a directory service database and Systems Management Server (SMS) of an enterprise computing networked computing system for web based self service configuration changes on a server owner defined schedule. The framework will cross reference the SMS database with the configuration framework database and dynamically update or create SMS server collections and advertisements for each unique time and day selected. For example, all systems that have had "Monday at 8 PM" selected as their scheduled date and time would become a member of the same collection. Upon opening the web site, the system owner is presented a data grid populated with a list of servers for which the individual is responsible, enabling selection of specific days and times for each server at which configuration changes sent by the SMS will occur.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
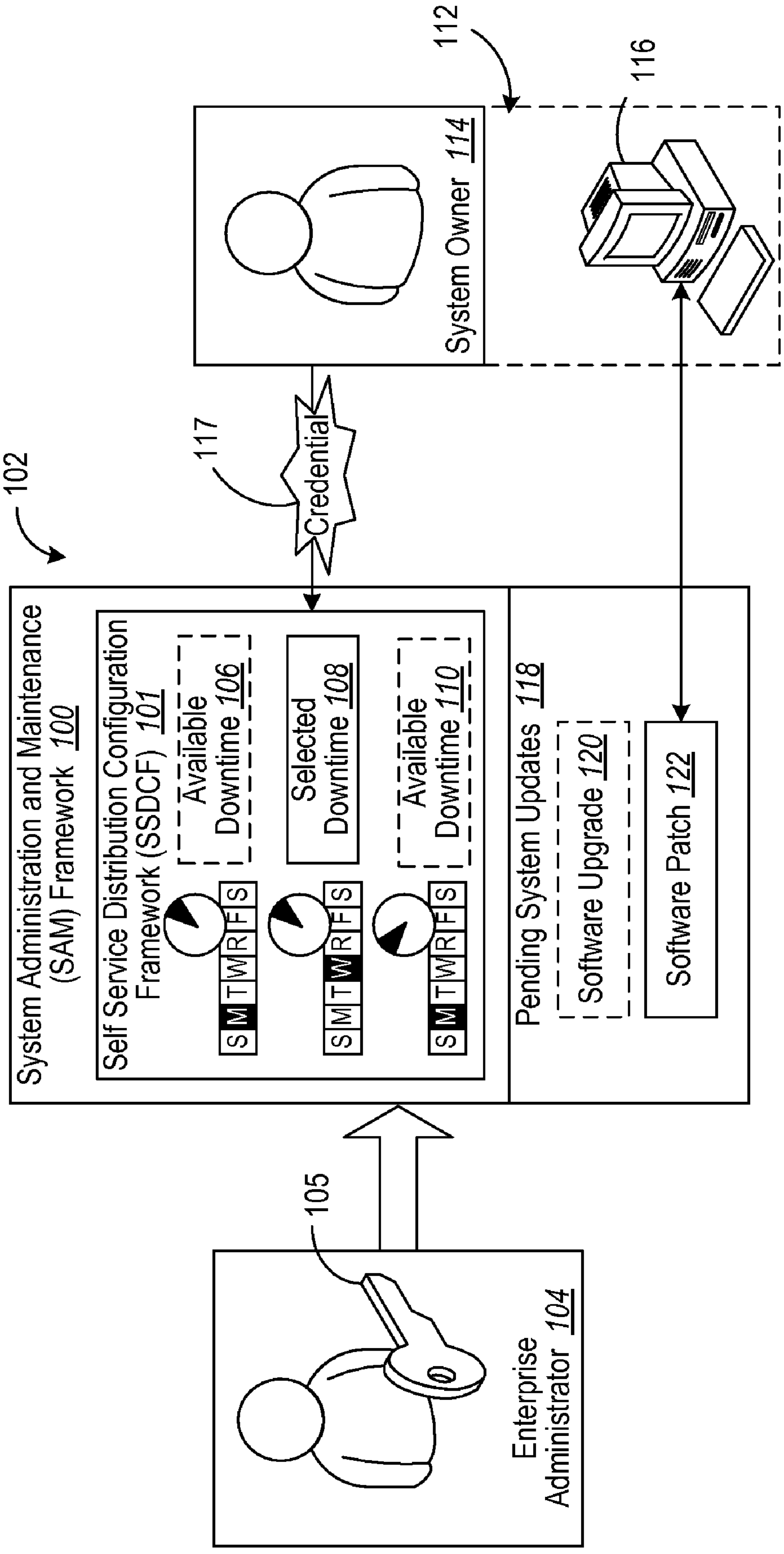
FIG. 1 is a block diagram illustrating an overview of an exemplary System Administration and Maintenance (SAM) framework managed by enterprise administrators for enabling system owners to schedule downtime for their systems.

Referring initially to FIG. 1, illustrated is a System Administration and Maintenance (SAM) system 100 that hosts a Self Service Distribution Configuration Framework (SSDCF) 101 for providing self-service distribution configuration for an enterprise computing network 102. Scalability and system integrity are facilitated by having the SAM system 100 managed by enterprise administrators 104 having a commensurate level of information technology (IT) expertise and system authorization, depicted as a permission key 105 for managing SAM system 100. As such, the enterprise administrators 104 can implement a plurality of available downtime slots 106, 108, 110 to achieve efficiencies of coordinated software distribution and maintenance with a degree of flexibility to accommodate the needs for a particular business unit 112, depicted as having a system owner 114 who manages a subset of computing systems 116 of the enterprise computing network 102. The system owner 114 lacks system authorization, but has credentials 117 that identify his assigned computing systems 116. In particular, the enterprise administrators 104 can facilitate a set of pending system updates 118 of software upgrades 120 and software patches 122. The system owner 114 can interact within the predefined options of the SSDCF 101 facilitated by the SAM system 100 to specify that the selected downtime 108 is to be applied to a particular software patch 122 that corresponds to the managed computing systems 116.

It should be appreciated with the benefit of the present disclosure that this balances the need of system owners to specify downtimes against the need for application owners, represented by the enterprise administrators 104, to maintain system uptime requirements, while reducing the risk of impacting other systems and the infrastructure itself.

Figure 2:
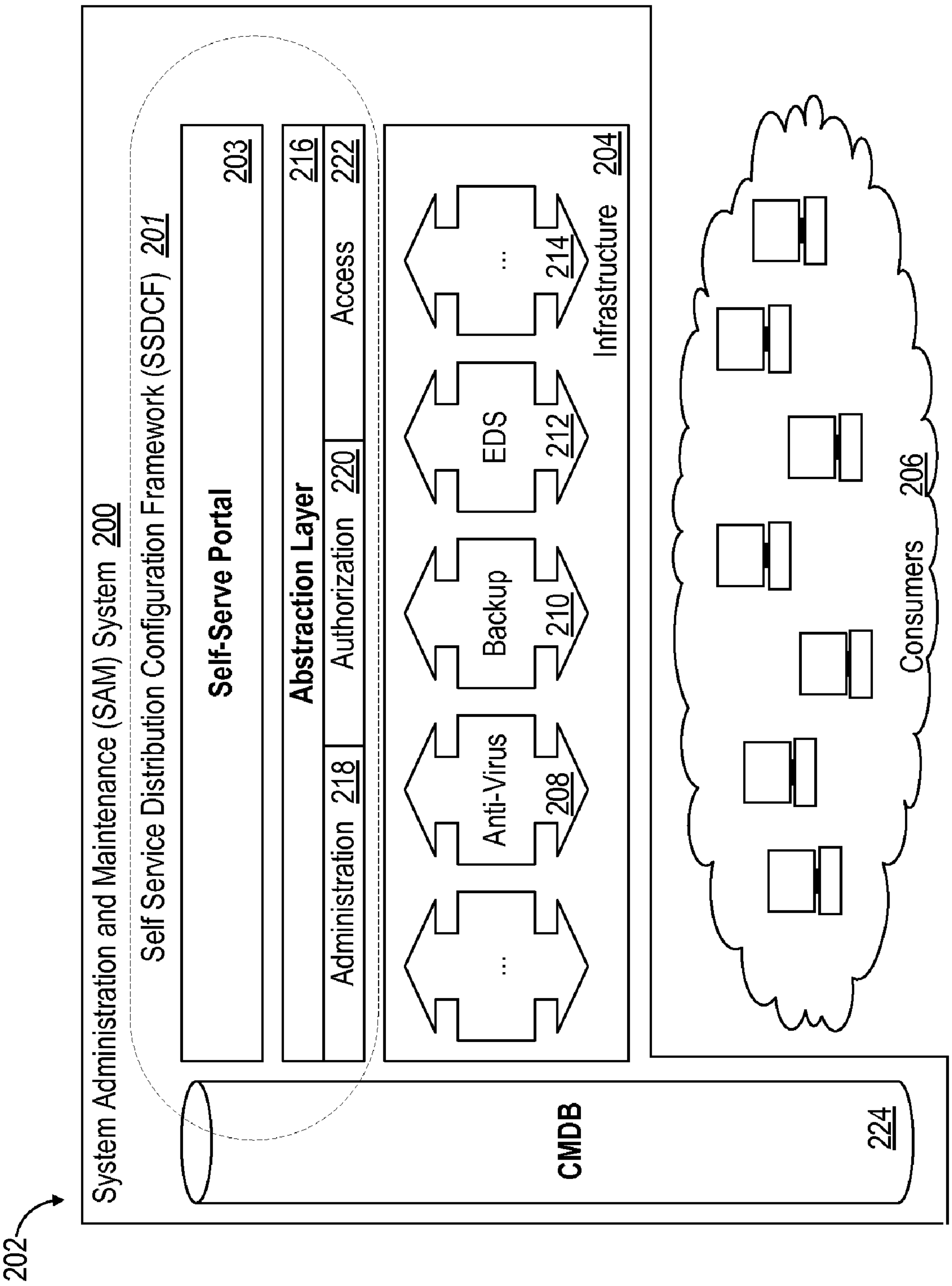
FIG. 2 is a block diagram illustrating an overview of an exemplary SAM framework implementation for supporting a plurality of software deployment systems coordinated by a Configuration Management Database (CMDB) prompted from a self-service portal via an abstraction layer.

In FIG. 2, in another aspect, a System Administration and Maintenance (SAM) system 200 provides a scalable abstraction framework for a Self-Service Configuration Distribution Framework (SSCDF) 201. An enterprise computing network 202 thereby can have certain scheduling of maintenance or administrative functions accessible to users via a self service portal 203 without needing elevated privileges to an underlying infrastructure 204 that supports a population of consumer (end user) computing systems 206. In the exemplary depiction, the infrastructure 204 can perform a number of administrative/distributive functions requiring downtime of subsets of the computing systems 206, depicted as an anti-virus (malware) component 208, a backup component 210, an enterprise distribution system (EDS) 212, and other components 214. An abstraction layer 216 provides the interface between the self-serve portal 202 and the infrastructure 204 by including administration interfaces 218, authorization interfaces 220, and access interfaces 222. Particular configuration settings that schedule downtime windows utilized by the infrastructure 204 set by the self-serve portal 202 are contained in a configuration management database (CMDB) 224.

Figure 3:
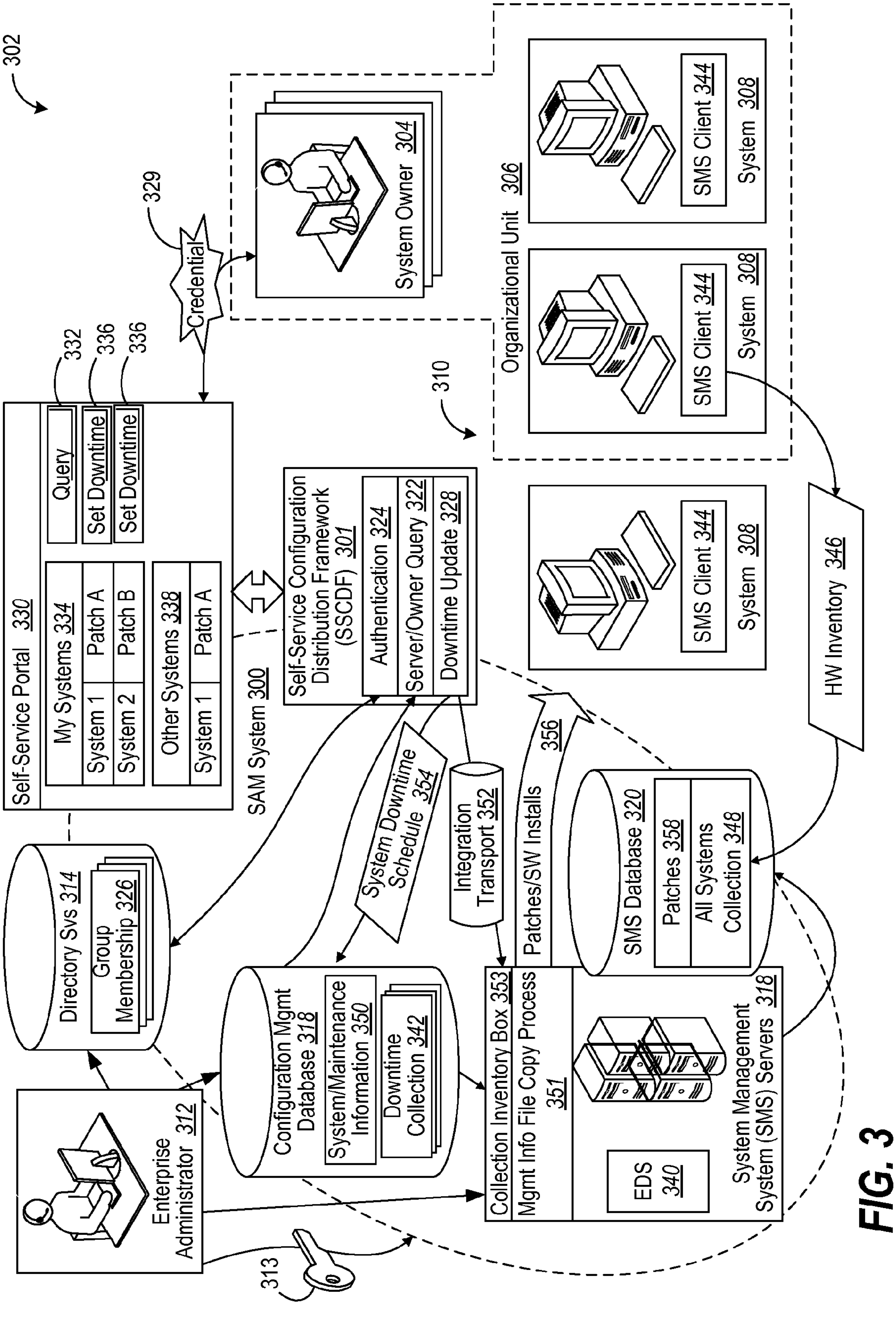
FIG. 3 is a block diagram of illustrative enterprise computing network having downtime windows managed by the SAM framework in response to owner inputs via a portal.

In FIG. 3, in another aspect, a System Administration and Maintenance (SAM) system 300 hosts a self-service configuration distribution framework (SSCDF) 301 for allowing certain modifications to an enterprise computing network 302. In the illustrative version, system owners 304 of an organizational unit 306 can manage downtime for their assigned computer systems 308 as a subset of a population of networked computing systems 310. Enterprise administrators 312 manage the SAM system 300 by having elevated privileges, depicted as an access key 313, with regard to a directory services database 314, a configuration management database (CMDB) 316, and System Management Servers (SMS) system 318, including its SMS database 320, updated by the SMS 318. Further, the enterprise administrators 312 set the parameters for the SAM system 300, such as specifying read functions of a server/owner query component 322 in accordance with an authentication component 324 that references group membership data 326 of the directory services database 314, and write privileges and time windows that constrain a downtime update component 328. The extent of the system owners 304 responsibilities and thus use of the SSCDF 301 are specified by assigned credentials 329. A self-service portal 330 supported by the SAM system 300 provides a graphical user interface (GUI) for the system owner 304. Query controls 332 allow the system owner 304 to view a status of assigned system, depicted at 334. Downtime selection controls 336 can be used to set downtime for these assigned systems. The query controls 332 can also pull up a read-only status of unassigned systems, depicted at 338.

It should be appreciated with the benefit of the present disclosure that a database-driven SAM system 300 integrates with directory services of the directory services database 314 and an enterprise distribution systems (EDS) 340 performed by the SMS system 318 to allow for web based self service configuration changes on a server owner defined schedule. These downtime selections are stored in the CMDB 316 that is integrated with the SMS database 320 for performing EDS 340. The SAM system 300 cross references the SMS database 320 with the CMDB 316 and dynamically updates or creates EDS server collections and advertisements 342 for each unique time and day selected. For example, all systems that have had "Monday at 8 PM" selected as their scheduled date and time would become a member of the same collection 342.

Hereafter is described another exemplary aspect of a specific implementation comprising interactions between these components for a managed system to receive administrative direction from SAM system 300. In particular, An SMS client 344 is installed on each computer system 308 using a domain startup script. Assignment is determined by the directory service database 314 according to the Organizational Unit (OU) 306 in which the managed system 308 resides. Each SMS client 344 performs a hardware inventory shortly thereafter (e.g., 10 minutes after the SMS client is installed) and transmitted to the SMS system 318 as depicted at 346. The hardware inventory 346 for the particular computing system 308 is added to an All Systems Collection 348 in the SMS database 320 periodically (e.g., daily).

Synchronization of the CMDB 316 is a scheduled task that runs fairly frequently (e.g., hourly). In the illustrative implementation, the synchronization scheduling task runs a script that accomplishes the following. (a) The script runs an application which purges stale records from system/maintenance information 350 the CMDB 316. (b) Also, the script checks for any errors during this process and it will send email alerts if any are found. (c) The two tasks use an Open Database Connectivity (ODBC) driver to communicate with the CMDB database 316.

A SAM Management Information File (MIF) copy process 351 runs nightly as a scheduled task on the SMS system 318 with appropriate credentials. This process reads system names from CMDB 316 and finds the corresponding object in the SMS database 320 on the central SMS system 318. The SAM MIF copy process 351 creates the MIF file which is a plain text file in a specific format. The file contains an SMS guide ("SMSGUID") for the managed system 308, such as the value for the patch day/time and the "Exclusion" value from the CMDB database 316. The SAM MIF Copy process also adds additional necessary field values from the CMDB 316 to the MIF file. For example, the criticality of the server can be used by the SMS system 318 to logically group managed objects. The MIF file is depicted being transported from the downtime update 328 of the SSCDF 301 to the SMS 318 for consumption as depicted at the transport integration 352. It should be appreciated that the CMDB 318 can hold configuration information for various types of hosts, for example an XML configuration file to send to a server instead of a text file.

The SAM MIF Copy process then reads which SMS system the client reports to and copies the MIF file to an inventory box share 353 on that SMS server of the SMS system 318. Some of the SMS site systems are not in a trusted domain, therefore the MIF Copy process 351 needs to know which username/password to use per SMS system. The MIF Copy process reads this information from an encrypted file located in the same directory as the SAM MIF Copy executable. The MIF file is processed by the SMS system 318. SAM data is then associated with a specific managed system 308. The class of SAM_Data and CMDB 316 can be viewed in an SMS resource explorer (not shown) for a particular system.

Frequently (e.g., thirty (30) minutes), system downtime schedule updates 354 made at the self-serve portal 330 are reflected in the SMS system 318. All systems 308 can be added to the maintenance window downtime collection 342 that coincides with the matching patch day, time, and criticality level. Application advertisements are created, if they do not already exist, for the appropriate maintenance window downtime collection 342. Based on the day and time selected for that system 308, the system 308 will run the advertisements to alert end users. Then, the particular server (not shown) of the SMS system 318 causes the scheduled patches/software installs to occur as depicted at 356, taken from stored patches/software upgrades 358 from the SMS database 320.

Thus a system owner 304 is able to self service their maintenance windows without having elevated control or direct access to the distribution infrastructure. Usually this function would require wide scale elevated privileges which places an undue burden on governance of the SMS system 318.

Figure 4:
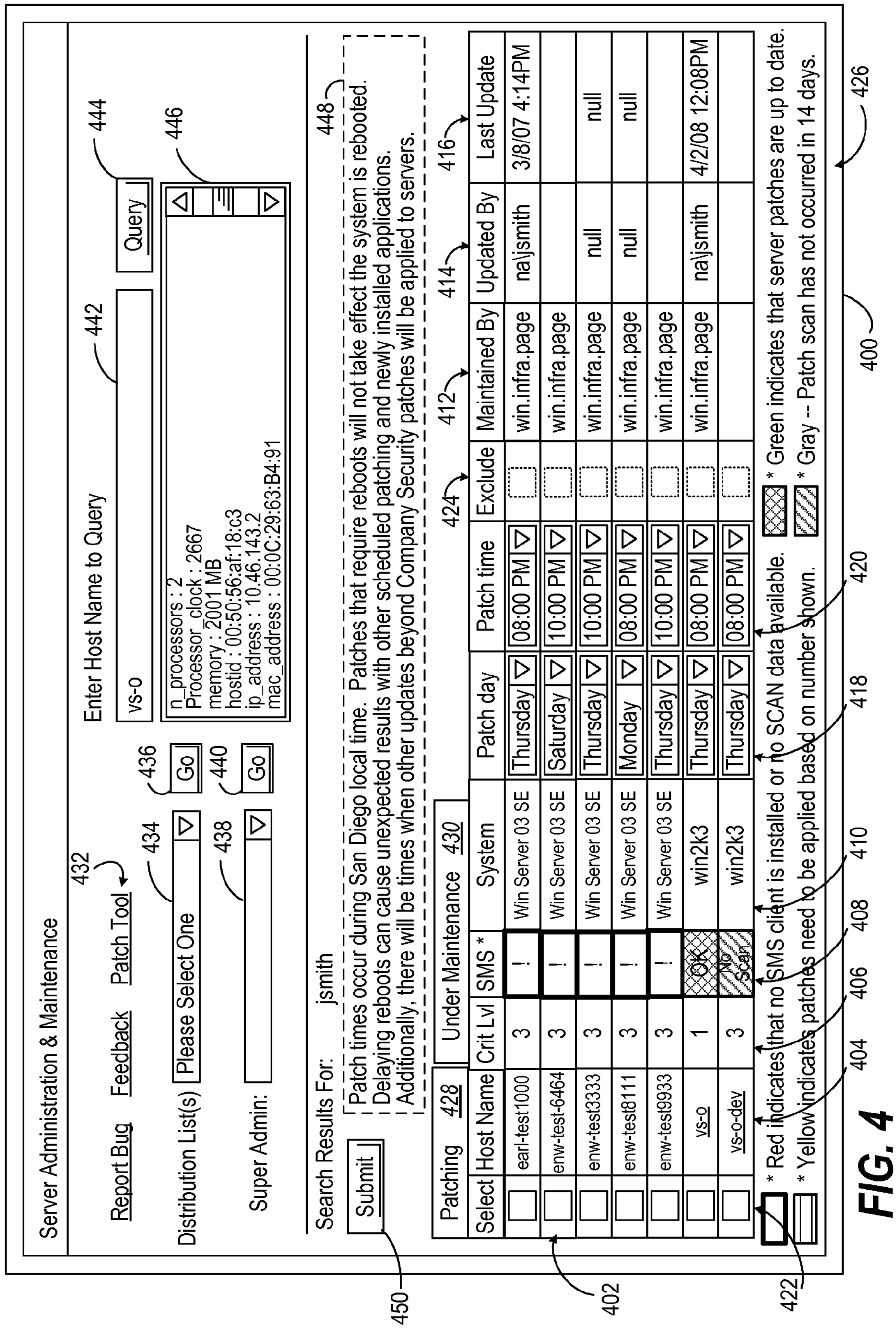
FIG. 4 is a diagram of a graphical user interface (GUI) for the SAM framework portal depicting a user default list.

With reference to FIG. 4, upon opening a portal web site 400, the system owner is presented a data grid 402 populated with a list of computer servers for which he or she is responsible. Columns of data presented include "Host Name" 404, "Criticality Level" 406, "SMS" Status 408, "System" 410, "Maintained By" 412, "Updated By" 414, and "Last Update" 416. Some of these fields, such as "Criticality Level" 406 can be read/write for the system owner, depending on the particular implementation. As a result the computer system owner can select specific days and times for each server at which configuration changes sent by the EDS 338 (FIG. 3) to occur by using downtime pull down "Patch Day" and "Patch Time" menu controls 418, 420. Other controls per record include "Select" radio buttons 422 and "Exclude" radio buttons 424. A legend 426 explains annotations for the "SMS" Status 408, including red for no SMS client installed or no scan data available, yellow indicating patches need to be applied based on number shown, green indicating server patches are update to date, and gray indicating that a patch scan has not occurred within a predetermined period of time (e.g., 14 days). The data grid 402 has a "Patching" tab 428 for seeing those computer servers patch status, as depicted. The data grid 402 also has an "Under Maintenance" tab 430 for seeing those computer servers currently undergoing a downtime for a maintenance action. Above the data grid 402, the portal web site 400 also includes links 432 to "report bug", "feedback", and "patch tool" to request a patch/upgrade to be added to the data grid 402. A distribution list pull down menu 434 and "Go" button 436 allow selection of other defined distribution lists. A supervisory administrator pull down menu 438 and "Go" button 440 allow for selecting servers assigned by supervisory administrator. A host name query box 442 and "Go" button 444 can pull up servers according to host name, even if downtime menu controls 418, 420 "gray out", depicting loss of permission to change settings for unassigned servers. A scrollable detail window 446 provides server details for a selected server using Select radio buttons 422. System information/warnings/disclaimer window 448 can disseminate information to system owners. A submit button 450 sends changes made in the data grid 402 from the portal web site 400 for implementation.

In FIG. 5, the portal web site 400 has authenticated a non-supervisory administrator, thus removing the supervisory administrator pull down menu 438 and "Go" button 440 as being inappropriate when having no subordinate administrators. The data grid 402 is populated with a list of computer servers for a selected distribution list of "GKChesterton".

Figure 6:
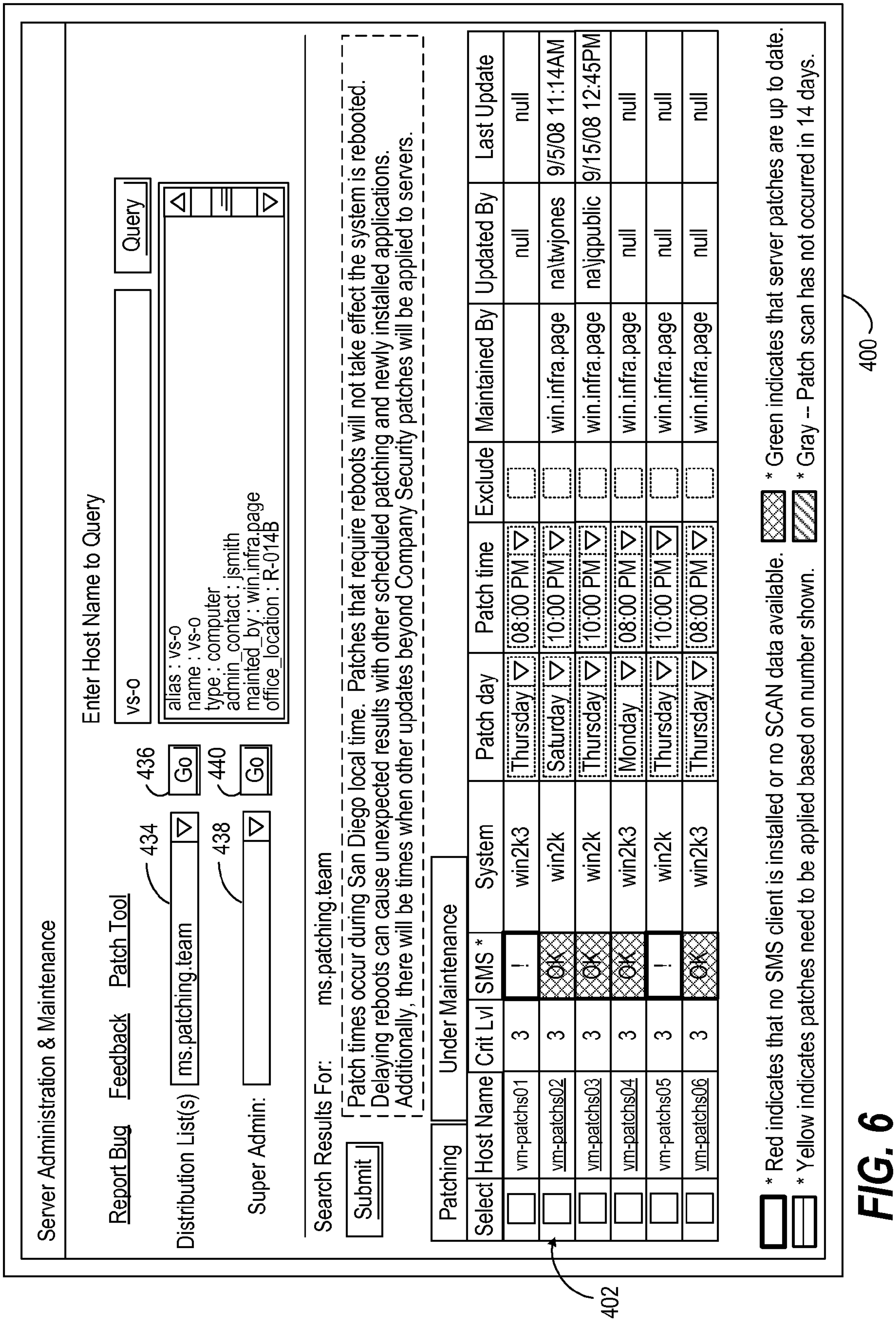
FIG. 6 is a diagram of the GUI for the SAM framework portal depicting a distribution list.

In FIG. 6, the portal web site 400 has authenticated a supervisory administrator, restoring the supervisory administrator pull down menu 438 and "Go" button 440 as being appropriate when having subordinate administrators. The data grid 402 is populated with a list of computer servers for a selected distribution list of "ms.patching.team".

In FIG. 7, the portal website 400 has been requested to display a SAM Machine Patch Report 500 either per machine as entered in box 502 ("vm-patchst02). An overview for this machine is listed in a first summary data record 504 comprising columns of "System Name" 506, "Client Installed" (yes or no) 508, "Assigned Site" 510, "Status" for any pending patches 512, a date/time for last MBSA scan 514, a time calculation since last MBSA scan 516, a date/time of last hardware scan 518, a time elapsed calculation since last hardware scan 520, a date/time since last boot 522 and a time calculation since reboot 524. A detailed listing 526 then gives information specific to each computing system supported by the machine, including columns for the "System Name" for the supporting machine (e.g., "vm-patchst02") 528, "Patch ID" 530, "Q Number" 532, "Product Name" 534, "Company Information Uniform Resource Locator (URL)" 536, and "Status" 538.

Figure 8:
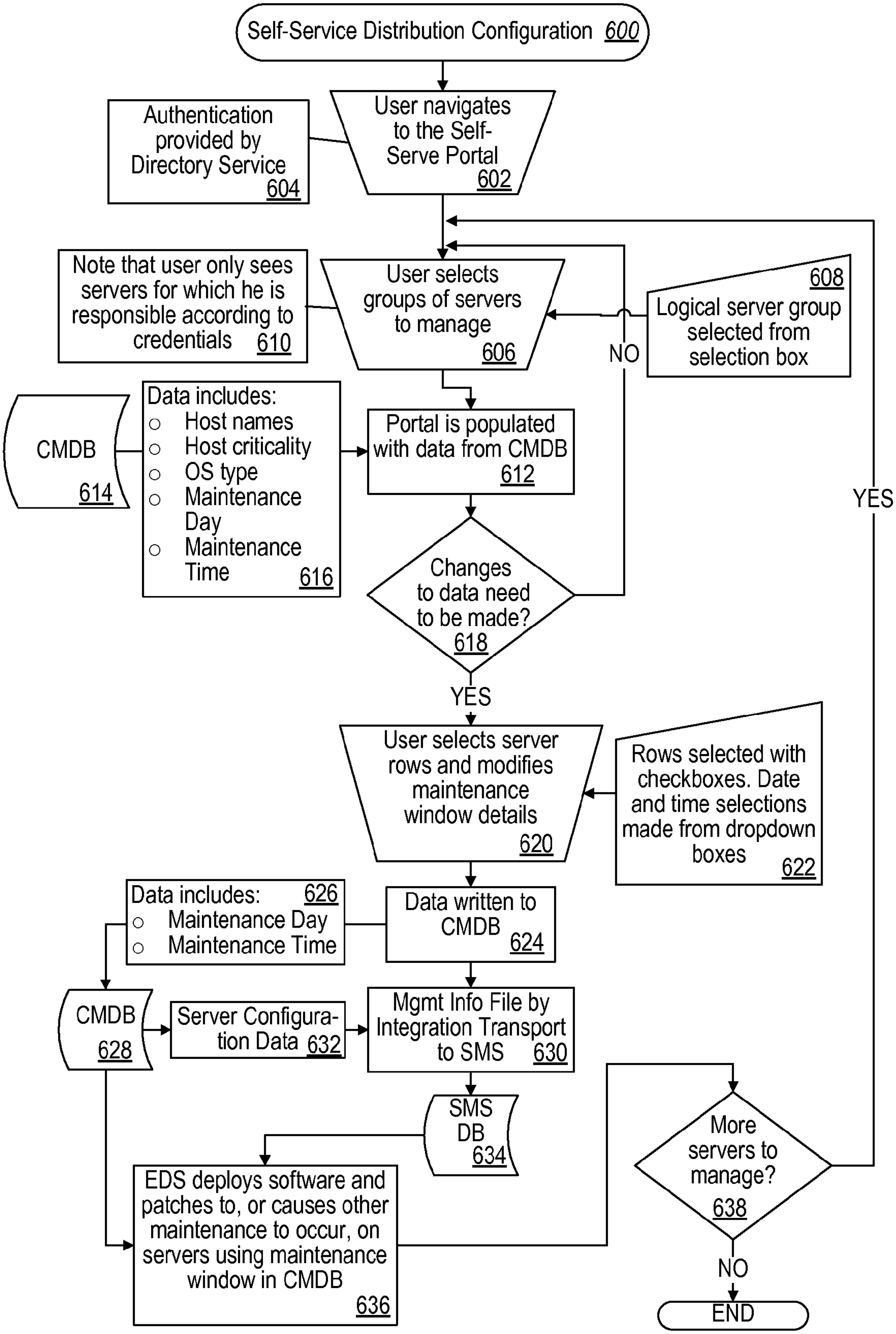
FIG. 8 is a flow chart illustrating a methodology for self-distribution configuration as a sample use case.

FIG. 8 illustrates a methodology and/or flow diagram in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

In FIG. 8, a methodology 600 for self-service distribution configuration begin with the user navigating to the self-service portal (block 602), which prompts authentication provided by the directory service (block 604). The user then selects groups of servers to manage (block 606), facilitated by receiving logical server group selections presented in a selection box (block 608). As noted, the user advantageously can be presented servers for which he is responsible according to assigned credentials (block 610). According to the selection, the portal is populated with data (block 612) that is received from the CMDB (block 614) and includes data such as host names, host criticality, operating system type, maintenance day, maintenance time (block 616). The user makes a determination as to whether a change should be made to the data (block 618). If so, then the user selects server rows and modifies maintenance window details (block 620), facilitated by row selected with check boxes and date/time selections made with drop down boxes (block 622). This prompts the data changes to be exported (block 624), including data regarding the maintenance day and maintenance time (block 626), to be written to a modified CMDB (block 628). The data is also transported as a management information file (MIF) to the SMS (block 630), which can include formatting (e.g., XML) appropriate for a particular target server as received from the CMDB 628 (block 632). The MIF is then stored in the SMS DB awaiting the scheduled deployment (block 634). The CMDB 628 and SMS DB 634 respond to a deployment system executing on the SMS, such as an EDS that causes deployment of software and patches to, or causes other maintenance to occur, on servers using the date/time window selections from the CMDB (block 636). The user can make a further determination as to whether there are more servers to manage (block 638). If yes in block 638 or if no in block 618, processing returns to block 606, else the methodology exits.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, a required level of security can be determined by contextual awareness, providing a learned weight to various contextual inputs.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, in one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It should be appreciated that any patent, publication, or other disclosure material, in whole or in part, that is the to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is the to be incorporated by reference herein, but which conflicts with existing definitions, statements, or other disclosure material set forth herein, will only be incorporated to the extent that no conflict arises between that incorporated material and the existing disclosure material.

The invention claimed is:

1. A method for managing downtime for software modifications to a population of networked computing systems, comprising:

receiving a management credential of a user;

determining, based on the management credential, a subset of system management servers of an enterprise computing network permitted to be managed by the user, wherein the subset of system management servers is less than an entirety of the system management servers;

determining, based on the management credential, configuration management actions permitted to be taken by the user;

receiving a configuration change from the user, wherein the configuration change identifies a user-defined downtime window, a configuration management action, and at least one of the subset of system management servers, wherein the configuration change schedules the configuration management action during the user-defined downtime window for the at least one of the subset of system management servers;

creating different server collections on the enterprise computing network, wherein each server collection comprises respective system management servers having a respective user-defined downtime window within a common range of time;

storing the created different server collections for a subsequent software modification of the subset of system management servers in accordance with the user-defined downtime window;

authenticating management credentials of an enterprise administrator user as having elevated rights;

facilitating query and software modifications to substantially all computing systems of the enterprise computing network for the enterprise administrator; and determining the subset of system management servers with reference to directory services database, creating different server collections in a configuration management database.

2. The method of claim 1, further comprising defining a plurality of discrete collection downtime windows selectable by the user, wherein determining the subset of system management servers further comprises determining a plurality of groups of system management servers, wherein receiving the configuration change further comprises receiving a respective configuration change corresponding to each of the plurality of groups of system management servers.

3. The method of claim 1, further comprising receiving a respective uptime requirement for each of the plurality of groups of system management servers, wherein the respective configuration change for each of the plurality of groups of system management servers comprises a respective user-defined downtime window based on the respective uptime requirement and independent of other user-defined downtime windows.

4. The method of claim 1, further comprising presenting a graphical user interface (GUI) portal to the user for receiving the management credential and user-defined downtime window.

5. The method of claim 1, further comprising defining an abstraction layer between a system management server system that interacts with the subset of computing systems and a self-service portal that interacts with the user.

6. The method of claim 1, further comprising installing a system management server client on each of the subset of computing systems to interact with the system management server system.

7. The method of claim 6, further comprising receiving a hardware inventory for each of the subset of computing systems each generated by the respective system management server system client.

8. The method of claim 1, further comprising storing system and maintenance information in a configuration management database for providing query information to the user.

9. The method of claim 8, further comprising limiting query results to the user based upon association of the user with particular computing systems.

10. The method of claim 1, further comprising:
- receiving a criticality rating for a software modification provided by the user; and
- collecting the downtime window selection as specified by the criticality rating.

11. The method of claim 1, further comprising performing the subsequent software modification of the subset of system management servers in accordance with the user-defined downtime window by performing an enterprise distribution service of software upgrades and software patch deployment.

12. The method of claim 1, further comprising performing the subsequent software modification of the subset of system management servers in accordance with the user-defined downtime window by performing a backup utility.

13. The method of claim 1, further comprising performing the subsequent software modification of the subset of system management servers in accordance with the user-defined downtime window by performing an anti-malware modification.

14. A non-transitory computer-readable medium having stored thereon instructions configured to cause a computer to perform operations for managing downtime for software modifications to a population of networked computing systems, the operations comprising:
- receiving a management credential of a user;
- determining, based on the management credential, a subset of system management servers of an enterprise computing network permitted to be managed by the user, wherein the subset of system management servers is less than an entirety of the system management servers;
- determining, based on the management credential, configuration management actions permitted to be taken by the user;
- receiving a configuration change from the user, wherein the configuration change identifies a user-defined downtime window, a configuration management action, and at least one of the subset of system management servers, wherein the configuration change schedules the configuration management action during the user-defined downtime window for the at least one of the subset of system management servers;
- creating different server collections on the enterprise computing network, wherein each server collection comprises respective system management servers having a respective user-defined downtime window within a common range of time;
- storing the created different server collections for a subsequent software modification of the subset of system management servers in accordance with the user-defined downtime window;
- authenticating management credentials of an enterprise administrator user as having elevated rights;
- facilitating query and software modifications to substantially all computing systems of the enterprise computing network for the enterprise administrator; and
- determining the subset of system management servers with reference to directory services database, creating different server collections in a configuration management database.

15. An apparatus for managing downtime for software modifications to a population of networked computing systems, comprising:
- means for receiving a management credential of a user;
- means for determining, based on the management credential, a subset of system management servers of an enterprise computing network permitted to be managed by the user, wherein the subset of system management servers is less than an entirety of the system management servers;
- means for determining, based on the management credential, configuration management actions permitted to be taken by the user;
- means for receiving a configuration change from the user, wherein the configuration change identifies a user-defined downtime window, a configuration management action, and at least one of the subset of system management servers, wherein the configuration change schedules the configuration management action during the user-defined downtime window for the at least one of the subset of system management servers;
- means for creating different server collections on the enterprise computing network, wherein each server collection comprises respective system management servers having a respective user-defined downtime window within a common range of time;
- means for storing the created different server collections for a subsequent software modification of the subset of system management servers in accordance with the user-defined downtime window;
- means for authenticating management credentials of an enterprise administrator user as having elevated rights;
- means for facilitating query and software modifications to substantially all computing systems of the enterprise computing network for the enterprise administrator; and
- means for determining the subset of system management servers with reference to directory services database, creating different server collections in a configuration management database.

16. An apparatus for managing downtime for software modifications to a population of networked computing systems, comprising:
- a directory services database;
- a self-serve configuration distribution framework for receiving a management credential of a user, and for determining, based on the management credential, a subset of system management servers of an enterprise computing network permitted to be managed by the user, wherein the subset of system management servers is less than an entirety of the system management servers by referring the directory services database, and for determining, based on the management credential, configuration management actions permitted to be taken by the user;
- a configuration management database for receiving a configuration change from the user, wherein the configuration change identifies a user-defined downtime window, a configuration management action, and at least one of the subset of system management servers, wherein the configuration change schedules the configuration management action during the user-defined downtime window for the at least one of the subset of system management servers for creating different server collections on the enterprise computing network, wherein each server collection comprises respective system management servers having a respective user-defined downtime window within a common range of time, and for storing the created different server collections for a subsequent software modification of the subset of system management servers in accordance with the user-defined downtime window, wherein the self-serve configuration distribution framework is further configured for authenticating management credentials of an enterprise administrator user as having elevated rights, and for facilitating query and software modifications to substantially all computing systems of the enterprise computing network for the enterprise administrator, further comprising determining the subset of system management servers with reference to directory services database, creating different server collections in a configuration management database.

17. The apparatus of claim 16, further comprising the self-serve configuration distribution framework for defining a plurality of discrete collection downtime windows selectable by the user, wherein determining the subset of system management servers further comprises determining a plurality of groups of system management servers, wherein receiving the configuration change further comprises receiving a respective configuration change corresponding to each of the plurality of groups of system management servers.

18. The apparatus of claim 16, further comprising the self-serve configuration distribution framework for receiving a respective uptime requirement for each of the plurality of groups of system management servers, wherein the respective configuration change for each of the plurality of groups of system management servers comprises a respective user-defined downtime window based on the respective uptime requirement and independent of other user- defined downtime windows.

19. The apparatus of claim 16, further comprising a graphical user interface (GUI) portal presented to the user for receiving the management credential and user-defined downtime window.

20. The apparatus of claim 16, the self-serve configuration distribution framework further comprising an abstraction layer between a system management server system that interacts with the subset of computing systems and a self-service portal that interacts with the user.

21. The apparatus of claim 16, further comprising a system management server client installed on each of the subset of computing systems to interact with the system management server system.

22. The apparatus of claim 21, further comprising the system management server client for receiving a hardware inventory for each of the subset of computing systems each generated by the respective system management server system client.

23. The apparatus of claim 16, further comprising the configuration management database for storing system and maintenance information for providing query information to the user.

24. The apparatus of claim 23, further comprising the self-serve configuration distribution framework for limiting query results to the user based upon association of the user with particular computing systems.

25. The apparatus of claim 16, further comprising the self-serve configuration distribution framework for receiving a criticality rating for a software modification provided by the user, and for collecting the downtime window selection as specified by the criticality rating.

26. The apparatus of claim 16, further comprising a system management server system for performing the subsequent software modification of the subset of system management servers in accordance with the user-defined downtime window by performing an enterprise distribution service of software upgrades and software patch deployment.

27. The apparatus of claim 16, further comprising a system management server system for performing the subsequent software modification of the subset of system management servers in accordance with the user-defined downtime window by performing a backup utility.

28. The apparatus of claim 16, further comprising a system management server system for performing the subsequent software modification of the subset of system management servers in accordance with the user-defined downtime window by performing an anti-malware modification.

* * * * *